(12) United States Patent
Matsui et al.

(10) Patent No.: US 8,198,818 B2
(45) Date of Patent: Jun. 12, 2012

(54) VEHICLE LIGHTING CONTROL DEVICE

(75) Inventors: Kotaro Matsui, Shizuoka (JP);
Takayoshi Kitagawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 428 days.

(21) Appl. No.: 12/388,740

(22) Filed: Feb. 19, 2009

(65) Prior Publication Data
US 2009/0212710 A1 Aug. 27, 2009

(30) Foreign Application Priority Data
Feb. 26, 2008 (JP) .................................. 2008-044650

(51) Int. Cl.
*B60Q 1/14* (2006.01)
*H05B 39/02* (2006.01)

(52) U.S. Cl. ...................................... 315/77; 315/209 R

(58) Field of Classification Search .............. 315/185 R, 315/291, 307, 76, 77–78, 80, 82, 209 R, 210–211; 362/800; 363/73–74, 77–80
See application file for complete search history.

(56) References Cited

U.S. PATENT DOCUMENTS

| | | | | |
|---|---|---|---|---|
| 6,127,789 A | * | 10/2000 | Ishizuka et al. | 315/308 |
| 6,577,072 B2 | * | 6/2003 | Saito et al. | 315/185 R |
| 6,734,639 B2 | | 5/2004 | Chang et al. | |
| 6,850,047 B2 | * | 2/2005 | Itabashi et al. | 323/284 |
| 6,858,995 B2 | * | 2/2005 | Lee et al. | 315/224 |
| 7,233,115 B2 | * | 6/2007 | Lys | 315/291 |
| 7,321,199 B2 | * | 1/2008 | Lee et al. | 315/194 |
| 7,368,885 B2 | * | 5/2008 | Takeda et al. | 315/308 |
| 2006/0001381 A1 | | 1/2006 | Robinson et al. | |
| 2007/0159421 A1 | | 7/2007 | Peker et al. | |

FOREIGN PATENT DOCUMENTS

| | | |
|---|---|---|
| EP | 1 648 205 | 4/2006 |
| JP | 2004-134147 | 4/2004 |

\* cited by examiner

*Primary Examiner* — Douglas W Owens
*Assistant Examiner* — Minh D A
(74) *Attorney, Agent, or Firm* — Fish & Richardson P.C.

(57) ABSTRACT

A vehicle lighting control device includes a switching unit to perform ON/OFF control of a driving current supplied to a semiconductor light source depending on a light control signal; and a constant-current control unit to perform constant-current control on the driving current. The constant-current control unit includes a switch unit to perform ON/OFF control of the switching unit; and a signal-maintaining unit to provide a voltage signal corresponding to the driving current to the switch unit when the switching unit performs ON control, and to provide continuously the voltage signal to the switch unit when the switching unit performs OFF control.

9 Claims, 5 Drawing Sheets

VEHICLE LIGHTING CONTROL DEVICE

This application claims priority from Japanese Patent Application No. 2008-04 4650, filed on Feb. 26, 2008, the contents of which are hereby incorporated by reference.

TECHNICAL FIELD

The present disclosure relates to a vehicle lighting control device, and more particularly, to a vehicle lighting control device for controlling lighting of a semiconductor light source including a semiconductor light-emitting element.

BACKGROUND

A light-emitting diode (LED) constant-current control circuit capable of lighting using pulse width modulation (PWM) includes, for a light source unit having multiple LEDs, a comparator amplifier (hereinafter, called an "op-amp"), a first negative channel metal oxide semiconductor (NMOS) transistor as a first switch, a second NMOS transistor as a second switch, and a shunt resistor. A gate of the first NMOS transistor is connected to a drain of the second NMOS transistor, and a drain of the first NMOS transistor is connected in series downstream (low side) of the light source unit (see e.g., Japanese Patent Document JP-A-2004-134147). The shunt resistor is connected in series to the light source unit and the first NMOS transistor.

The first NMOS transistor controls current supplied to the light source unit in response to a voltage provided to a gate terminal.

The shunt resistor detects a voltage depending on the current flowing to the light source unit. The shunt resistor detects the current (hereinafter, called "LED current") flowing to the light source unit as the voltage (hereinafter, called "detection voltage") between both ends of the shunt resistor.

The detection voltage is applied to an inverting input terminal (negative input terminal) of the op-amp, and a reference voltage is applied to a non-inverting input terminal (positive input terminal) of the op-amp. The op-amp transmits a comparison output signal to the gate of the first NMOS transistor. When the detection voltage detected by the shunt resistor is applied to the negative input terminal of the op-amp, the op-amp compares the detection voltage with the reference voltage applied to the non-inverting input terminal (positive input terminal) and applies a voltage (comparison output signal) according to the comparison result to the gate of the first NMOS transistor, thereby controlling ON/OFF operations of the first NMOS transistor.

The second NMOS transistor receives a PWM signal at a high level (H) or a low level (L) to provide a control signal at the low level (L) or the high level (H).

When the PWM signal is turned off, the second NMOS transistor receives the PWM signal at the high level (H) to be in an ON state. An output of the op-amp is maintained at the high-level, and the first NMOS transistor is in an OFF state, so that LED current does not flow.

When the PWM signal is turned on, the second NMOS transistor receives the PWM signal at the low-level (L) to be in the OFF state, and the first NMOS transistor is in the ON state, so that current flows to the LED. The output of the op-amp is a comparison output signal based on comparing the detection voltage detected by the shunt resistor with the reference voltage applied to the positive input terminal of the op-amp.

As described above, as constant-current control is performed in response to ON/OFF of the PWM signal, the LED current is maintained (lighting control of the LED) at a given level, thereby lighting up the LED with a proper intensity.

In the foregoing circuit, after the PWM signal is turned on, the comparison output signal of the op-amp rapidly drops, and a higher LED current tends to flow. Accordingly, until the level of the LED current becomes stable at a desired level depending on the comparison output signal of the op-amp after a DC power supply is turned on, the LED current rapidly increases, and an overshoot occurs.

In addition, since the output of the op-amp rapidly changes, the op-amp easily oscillates. In the case where a phase compensation is increased using a condenser to prevent oscillation of the op-amp, the period of overshoot of the LED current increases, feedback control does not follow the PWM signal, and thus response characteristics of the op-amp may be deteriorated. Particularly, when the on-duty of the PWM signal is shortened, ON/OFF control cannot be performed, and thus constant-current control cannot be performed.

In addition, since the cathode side of the LED performs the constant-current control, a ground fault of the cathode of the LED has to be considered, and this tends to increase the complexity of the circuit configuration.

In addition, when a ground fault of the anode side of the LED occurs, a high current flows to an LED driving unit for supplying the LED current to the LED, and thus this causes a breakdown in the LED driving unit.

SUMMARY

Some embodiments of the present invention address the foregoing or other issues.

A first aspect of the present invention relates to a vehicle lighting control device capable of preventing an overshoot that occurs right after an LED is turned on, thereby improving safety.

According to some embodiments of the present invention, a vehicle lighting control device includes a switching unit to perform ON/OFF control of a driving current supplied to a semiconductor light source depending on a light control signal; and a constant-current control unit to perform constant current control on the driving current. The constant current control unit includes a switch unit to perform ON/OFF control of the switching unit; and a signal maintaining unit to provide a voltage signal corresponding to the driving current to the switch unit when the switching unit performs ON control, and to provide continuously the voltage signal to the switch unit when the switching unit performs OFF control.

DETAILED DESCRIPTION OF EXEMPLARY EMBODIMENTS OF THE INVENTION

Figure 1:
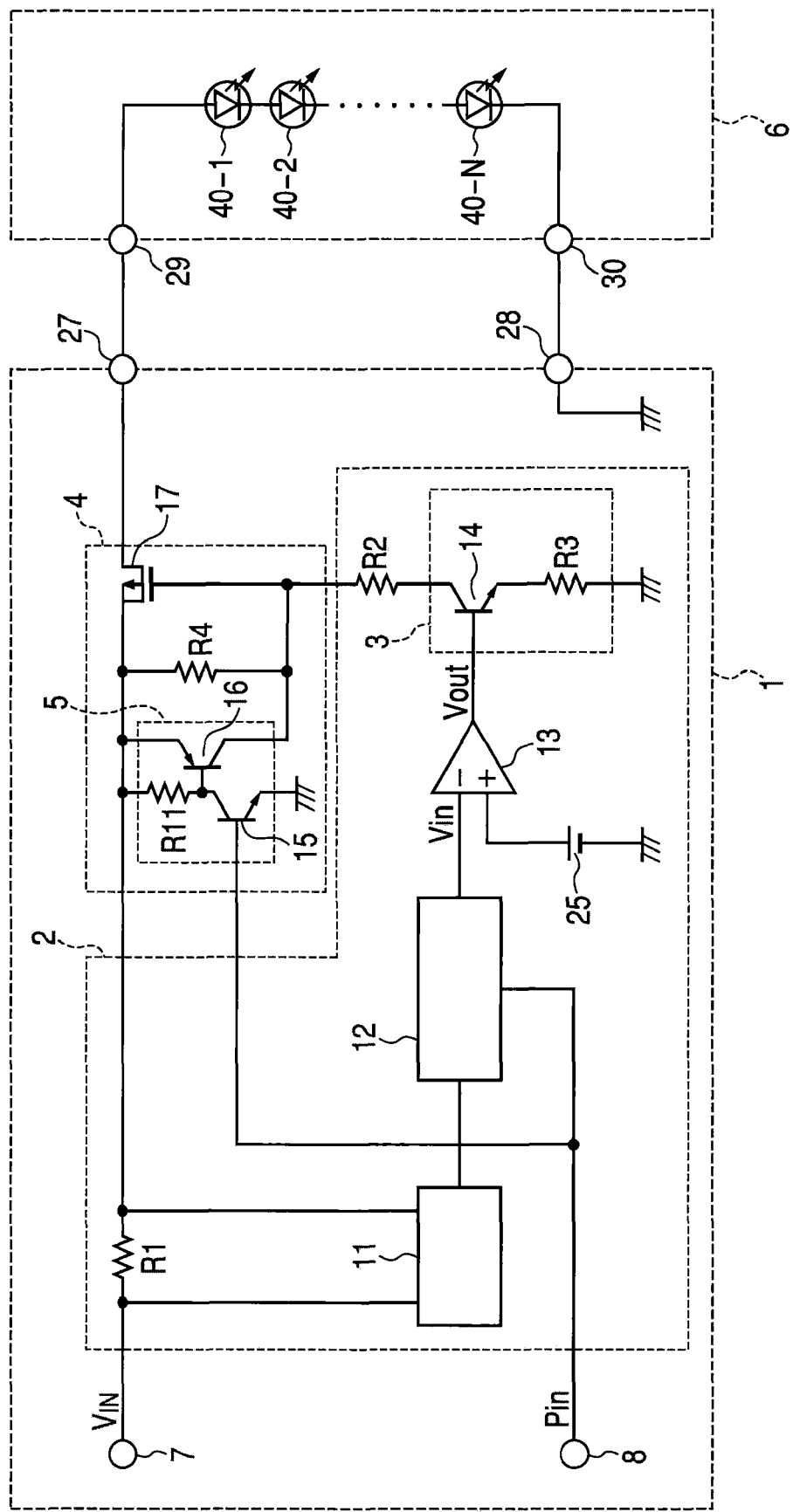
FIG. 1 is a view illustrating a configuration of a vehicle lighting control device according to an embodiment of the present invention.
Figure 2:
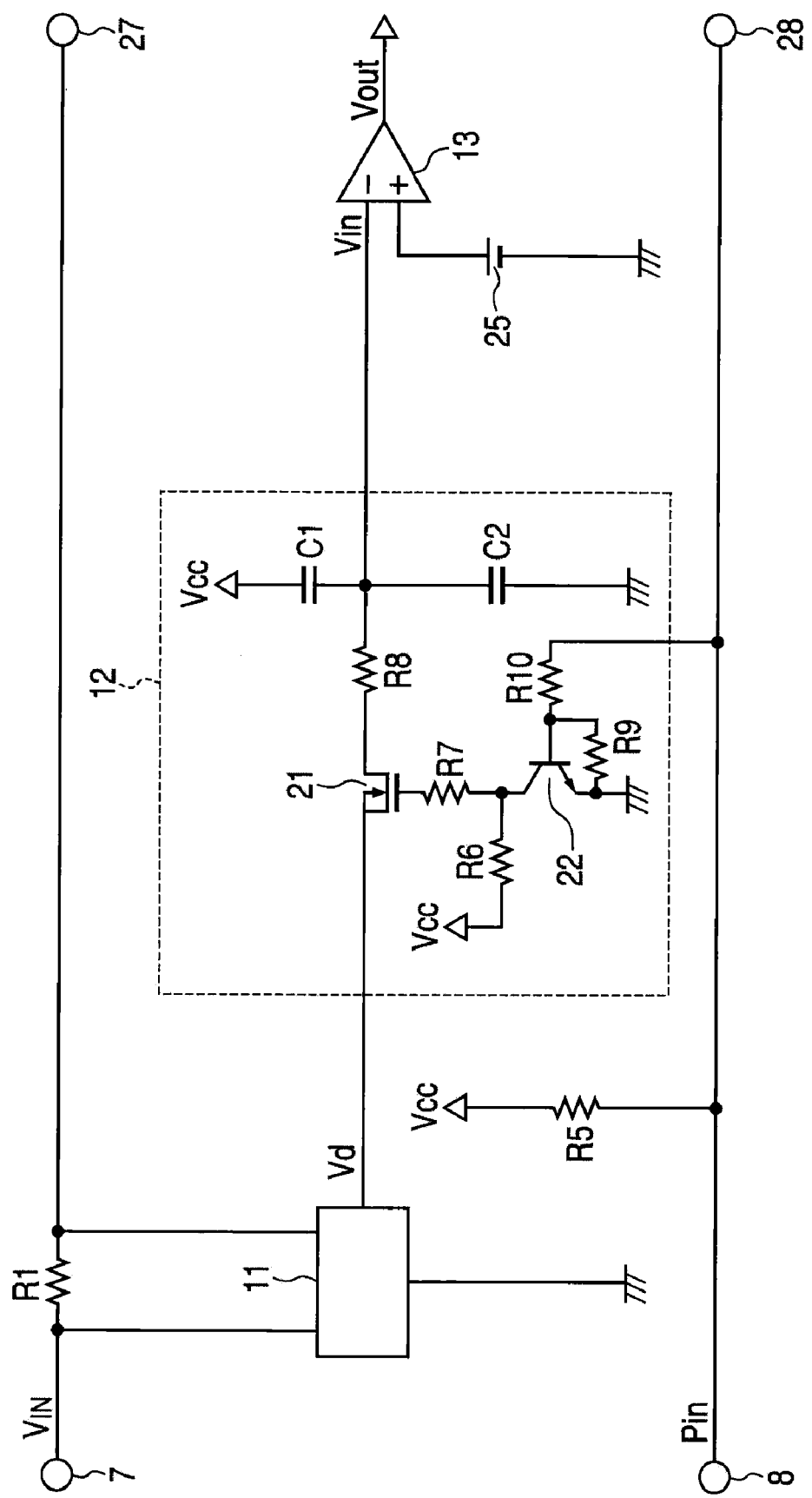
FIG. 2 is a view explaining a configuration of a sample and hold circuit.
Figure 3:
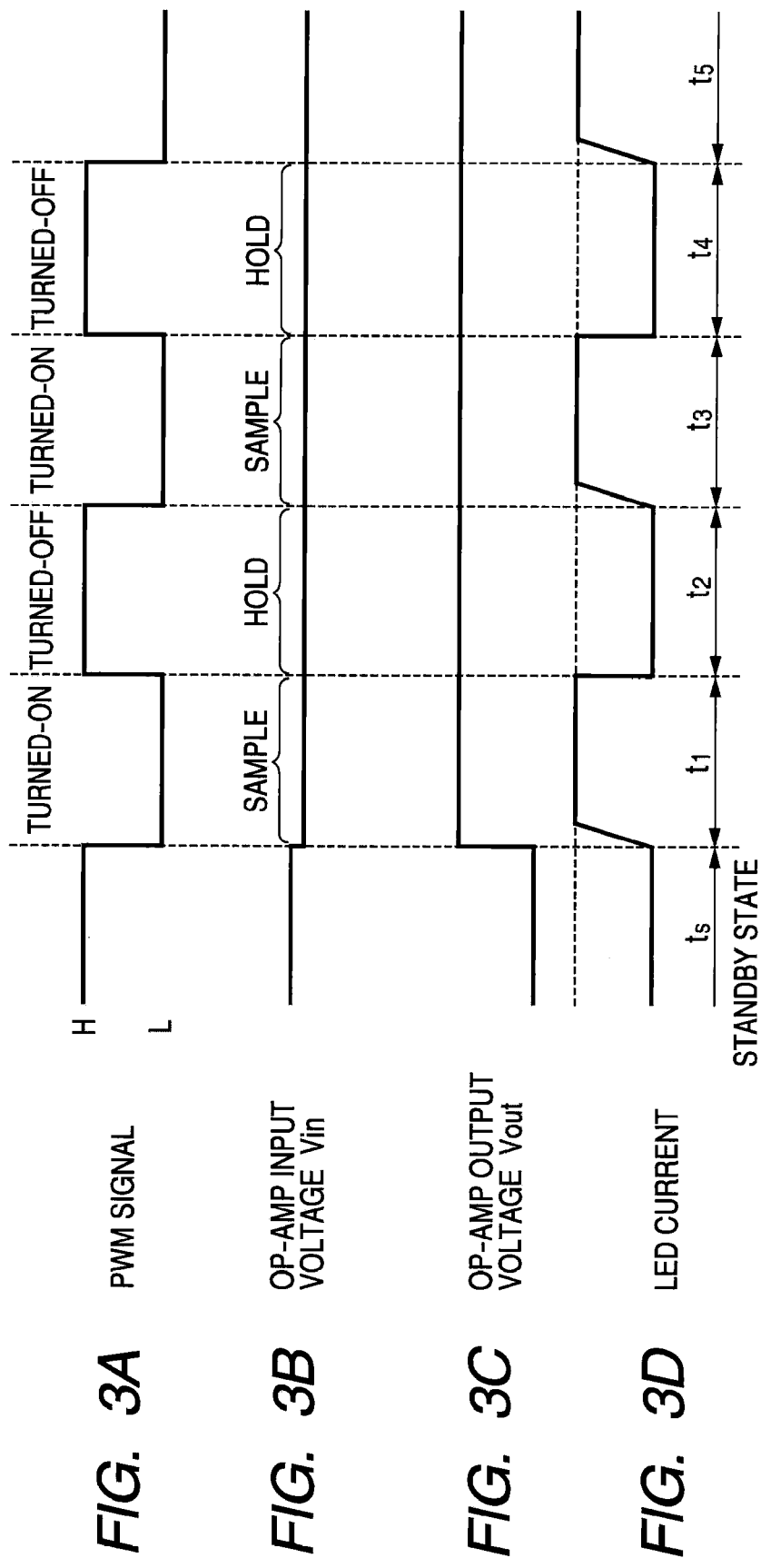
FIGS. 3A to 3D are timing charts explaining an operation of the vehicle lighting control device.
Figure 4:
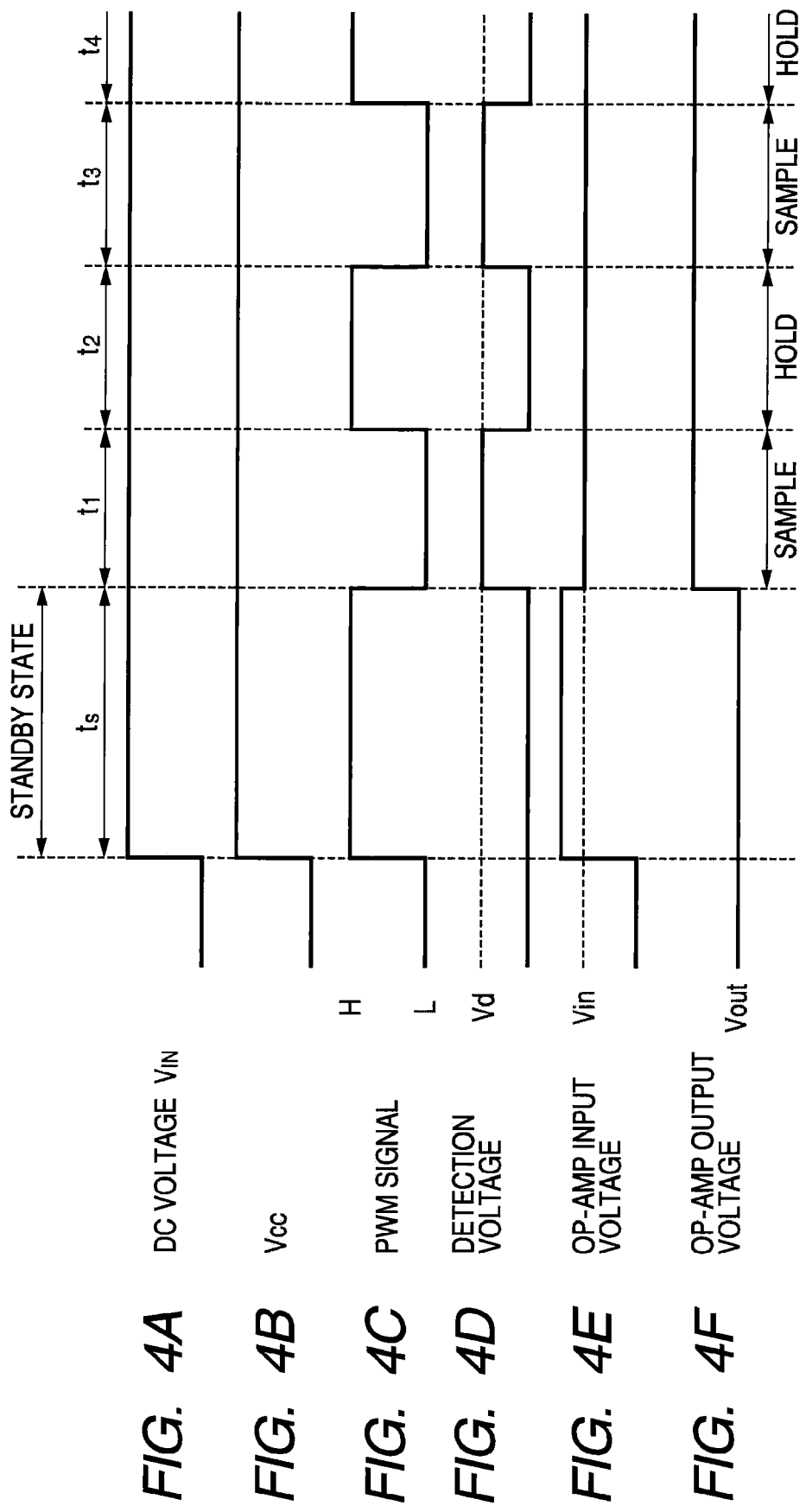
FIGS. 4A to 4F are timing charts explaining an operation of the sample and hold circuit.

Exemplary embodiments of the present invention described in detail below with reference to the drawings.

The vehicle lighting control device 1 includes a constant-current circuit 2 and a switching unit 4.

The constant-current circuit 2 includes a current detection circuit 11, a sample and hold circuit 12, an op-amp (comparator amplifier) 13, and a switch unit 3.

The sample and hold circuit 12 functions as a signal-maintaining unit and includes a negative channel metal oxide semiconductor (NMOS) transistor 21, an NPN transistor 22, a pull-up power supply Vcc, a resistor R8, and condensers C1 and C2. A drain of the NMOS transistor 21 is connected to an inverting input terminal (negative input terminal) of the op-amp. A gate of the NMOS transistor 21 is connected to a collector of the NPN transistor 22. A base of the NPN transistor 22 is connected to an output side of a pulse width modulation (PWM) signal generator for generating a PWM signal.

A non-inverting input terminal (positive input terminal) of the op-amp 13 is connected to a DC power supply 25.

The switch unit 3 includes a NPN transistor 14. A base of the NPN transistor 14 is connected to an output terminal of the op-amp 13.

The switching unit 4 includes a positive channel metal oxide semiconductor (PMOS) transistor 17 and a high-side switch unit 5. The high-side switch unit 5 includes an NPN transistor 15 and a PNP transistor 16.

A base of the NPN transistor 15 is connected to the output side of the PWM signal generator, and a collector of the transistor 15 is connected to a base of the PNP transistor 16 and a resistor R11. A collector of the PNP transistor 16 is connected to a collector of the NPN transistor 14 and a gate of the PMOS transistor 17.

A drain of the PMOS transistor 17 is connected to a light source unit 6 via an output terminal 27. The light source unit 6 includes LEDs 40-1 to 40-N. An anode of the LED 40-1 is connected to the output terminal 27 via a light source input terminal 29. A cathode of the LED 40-N is connected to an output terminal 28 via a light source input terminal 30.

Next, operation of the vehicle lighting control device 1 is described with reference to timing charts of FIGS. 3A to 4F.

When a DC voltage $V_{IN}$ is supplied from a power supply via a power supply input terminal 7, current detection is performed by the current detection circuit 11 via the shunt resistor R1. The current detection circuit 11 supplies a detection voltage Vd to the sample and hold circuit 12 via the shunt resistor R1. The shunt resistor R1 detects LED current supplied from a switching regulator to the LEDs 40-1 to 40-N as the detection voltage Vd between both ends of the shunt resistor R1. Lighting control of the light source unit 6 is in a standby state as the detection voltage Vd is supplied to the sample and hold circuit 12 (time interval $t_S$). In addition, the detection voltage Vd is at a low level in the standby state.

A PWM signal Pin serves as a lighting control signal from the PWM signal generator, and is provided as a low-level signal initially and transitioned to a high-level signal when starting the standby state. Thereafter, the low-level signal and the high-level signal are alternately provided as output at a predetermined duty cycle (ratio between on-duty and off-duty) thereby lighting the LED (see FIG. 3A).

Since the PWM signal Pin provided to the base of the NPN transistor 22 is a high-level signal in the standby state, the NPN transistor 22 is in an ON state, and the NMOS transistor 21 is in an OFF state. Therefore, the detection voltage Vd is not provided from the sample and hold circuit 12, and a pull-up voltage is transmitted from the pull-up power supply Vcc via the condensers C1 and C2. The input voltage Vin is provided to the negative input terminal of the op-amp 13.

The voltage of the pull-up power supply Vcc and the capacitances of the condensers C1 and C2 are set in advance so that the input voltage Vin provided to the op-amp 13 is greater than a reference voltage provided to the positive input terminal of the op-amp 13 and also greater than the detection voltage Vd (see FIGS. 3B and 4E). Therefore, an output voltage Vout of the op-amp 13 is still at the low-level (see FIGS. 3C and 4F).

Thereafter, when the PWM signal Pin is provided as the low-level signal (time interval $t_1$ of FIGS. 3A to 4F), the sample and hold circuit 12 is in synchronization with the PWM signal Pin and performs a sampling function.

Since the PWM signal Pin provided to the base of the NPN transistor 22 is a low-level signal, the NPN transistor 22 is in the OFF state, and the pull-up voltage is supplied from the pull-up power supply Vcc to the gate of the NMOS transistor 21 via the resistor R6. Therefore, the NMOS transistor 21 is in the ON state, and the detection voltage Vd is provided to the negative input terminal of the op-amp 13 as the input voltage Vin of the op-amp 13. In addition, the output voltage Vout of the op-amp is an operational result of comparing the detection voltage Vd with the reference voltage so that the detection voltage Vd and the reference voltage are equal to each other. This operation signal (analog signal between the high-level and the low-level) is supplied to a gate of the NPN transistor 14 which functions as a switch unit, and the NPN transistor 14 is in the ON state.

The NPN transistor 15 receives the low-level PWM signal Pin and is in the OFF state, and the PNP transistor 16 is in the OFF state, and the PMOS transistor 17 is in the ON state. Accordingly, source-drain conduction of the PMOS transistor 17 is allowed, and the LED current for driving the LEDs 40-1 to 40-N depending on the output voltage of the op-amp is supplied (FIG. 3D).

Thereafter, when the PWM signal Pin is provided as the high-level signal (time interval $t_2$ of FIGS. 3A to 4F), the sample and hold circuit 12 is in synchronization with the PWM signal Pin to perform a holding function for a transition to an LED turned-off state.

Since the PWM signal Pin provided to the base of the NPN transistor 22 is a high-level signal, the NPN transistor 22 is in the ON state, and the NMOS transistor 21 is in the OFF state. Accordingly, the input voltage Vin of the op-amp 13 is maintained at the voltage level in the right before turned-on state, and the output voltage Vout of the op-amp 13 maintains the operational result (output voltage) in the turned-on state (see FIGS. 3C and 4F).

The NPN transistor 15 receives the high-level PWM signal Pin and is in the ON state, the PNP transistor 16 is in the ON state, and the PMOS transistor 17 is in the OFF state. Therefore, source-drain conduction of the PMOS transistor 17 is not allowed, and supplying the driving current to the LEDs 40-1 to 40-N is stopped (FIG. 3D)

The operation in a time interval $t_3$ is the same as that in the aforementioned time interval $t_1$, and the operation in a time interval $t_4$ is the same as that in the aforementioned time interval $t_2$. As long as the PWM signal Pin is continuously supplied, the operations in the time intervals $t_1$ and $t_2$ are repeated.

According to the illustrated embodiment, when the vehicle lighting control device 1 is supplied with the low-level PWM signal Pin in the standby state, the output voltage Vout of the op-amp 13 at a predetermined level is not changed until supplying the PWM signal Pin is stopped.

In addition, in the illustrated embodiment, the switching unit 4 and the switch unit 3 function as emitter followers. However, an NPN transistor and an NMOS transistor can be used instead of the PMOS transistor 17 and the NPN transistor 14, respectively, to function as source followers.

As described above, according to the illustrated embodiment, in the standby state (time interval $t_S$), the sample and hold circuit 12 is operated so that the input voltage Vin of the op-amp 13 is greater than the detection voltage Vd detected by the current detection circuit 11. Accordingly, the input voltage Vin of the op-amp 13 in the state right after being transited from the standby state to the turned-on state (time interval $t_1$) is greater than the reference voltage 25, and the detection voltage Vd is then maintained. Specifically, the input voltage Vin of the op-amp 13 in the turned-off state (time interval $t_2$), the turned-on state (time interval $t_3$), and the turned-off state (time interval $t_4$) is maintained at the detection voltage Vd and not changed. Therefore, overshoot does not occur when the LED current increases in the turned-on state (see FIG. 3D).

In addition, according to the illustrated embodiment, since the switching unit 4 is provided upstream (high side) of the light source unit 6, the output of the op-amp 13 is controlled via the switch unit 3. Specifically, by controlling the switching unit 4 provided on the high side, a gate voltage gain of the PMOS transistor included in the switching unit 4 on the high side for the output of the op-amp 13 can be at least one time, so that it is possible to prevent an oscillation error in feedback control.

In addition, according to the illustrated embodiment, the LED current is detected on the high side, so that it is possible to connect the cathode side of the LEDs 40-1 to 40-N to ground (GND). Therefore, there is no need to detect an error caused by a ground fault of the cathode side of the LEDs 40-1 to 40-N.

In addition, according to the illustrated embodiment, excessive current does not flow to the constant current circuit 2 for an error caused by a ground fault of the anode side of the plurality of the LEDs 40-1 to 40-N, so that safety can be improved.

Figure 5:
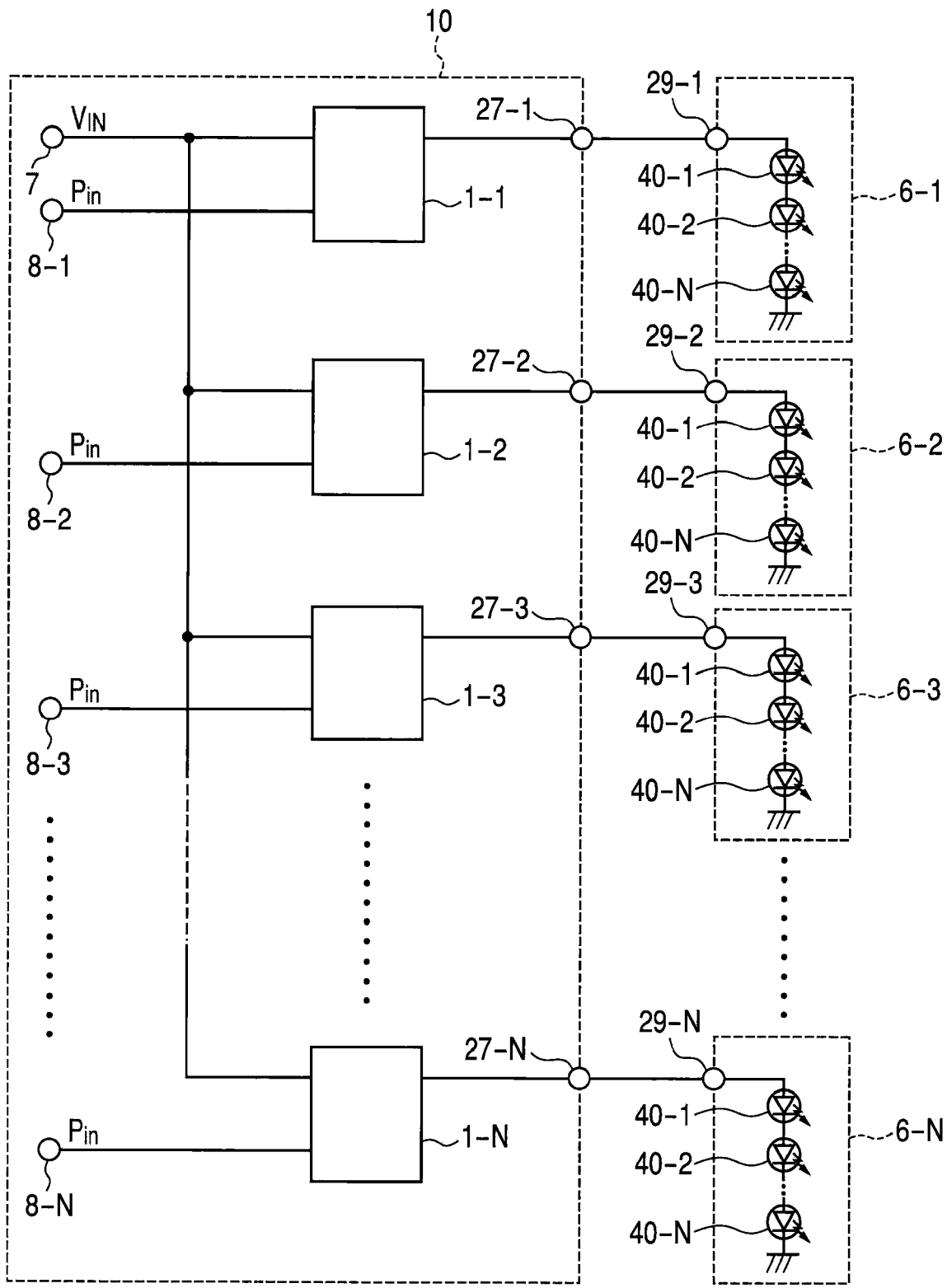
FIG. 5 is a view illustrating a configuration of a vehicle lighting control system provided with the vehicle lighting control device.

Next, a vehicle lighting control system using the vehicle lighting control device according to the foregoing embodiment is described. FIG. 5 is a view illustrating a configuration of the vehicle lighting control system 10.

The vehicle lighting control system 10 includes multiple vehicle lighting control devices 1 and multiple light source units 6 according to the illustrated embodiment. In the following description, the same elements as those used in the aforementioned first embodiment are described briefly.

The vehicle lighting control system 10 includes vehicle lighting control devices 1-1 to 1-N and light source units 6-1 to 6-N. The power supply input terminal 7 is connected to the current detection circuit 11 in each of the vehicle lighting control devices 1-1 to 1-N. Each of PWM signal input terminals 8-1 to 08-N is connected to a corresponding one of the vehicle lighting control devices 1-1 to 1-N. Each of the vehicle lighting control devices 1-1 to 1-N includes a sample and hold circuit 12 and high-side switch unit 5, which are connected to the corresponding one of the PWM signal input terminals 8-1 to 08-N.

When the direct current (DC) voltage $V_{IN}$ is supplied from the power supply via the power supply input terminal 7, current detection is performed by the current detection circuit 11 via the shunt resistor R1 in each of the vehicle lighting control devices 1-1 to 1-N. The current detection circuit 11 supplies the detection voltage Vd to the sample and hold circuit 12.

Each of the PWM signals Pin having different duty cycles is provided to the corresponding one of the sample and hold circuits 12 and the high-side switch units 5 of the respective vehicle lighting control devices 1-1 to 1-N via the respective PWM signal input terminals 8-1 to 8-N.

Each of the vehicle lighting control devices 1-1 to 1-N performs the same operation as the vehicle lighting control device 1 described above and performs PWM lighting control of the LEDs 40-1 to 40-N in the light source units 2-1 to 2-N.

In the vehicle lighting control system 10, each of the PWM signals Pin with different duty cycles can be provided to the corresponding one of the vehicle lighting control devices 1-1 to 1-N as described above. Therefore, in addition to the advantages according to the previously described embodiment, each of the light source units 2-1 to 2-N can perform PWM lighting control.

According to some embodiments, pulse width modulation (PWM) lighting control is performed on the driving current supplied to the semiconductor light source by ON/OFF switching depending on the light control signal. During the ON control, the voltage signal corresponding to the driving current supplied to the semiconductor light source is provided to the switch unit, and during the OFF control, the voltage signal is continuously provided to the switch unit.

Furthermore, according to some embodiments, overshoot, which may occur when the LED current increases in the turned-on control state of the PWM lighting control, can be prevented, and oscillation of a transistor that functions as the switching unit for the PWM lighting control can be prevented.

Since the signal-maintaining unit provides the voltage signal to be maintained at the level output during the ON control right before the OFF control, the input voltage of the op-amp can be prevented from being at the low level during a transition from the turned-on control state of the PWM lighting control to the turned-off control state, thereby maintaining the output voltage of the op-amp at a predetermined level.

Since the switching unit is series-connected to a positive electrode side of the semiconductor light source, it is possible to connect the cathode side of the LED to a ground, and there is no need to detect an error caused by a ground fault of the cathode side.

Since the signal maintaining unit provides, to the switch unit, a voltage signal having a voltage greater than that of the voltage signal provided during the ON control after a power supply voltage is provided, overshoot, which may occur when the LED current increases in the turned-on control state of the PWM lighting control, can be prevented.

Since the signal maintaining unit controls a current control unit by using at least one times a voltage gain during the ON control, even when response characteristics of the op-amp are increased to a level so as to follow the PWM signal, oscillation can be prevented.

While the present invention has been shown and described with reference to certain example embodiments, other implementations are within the scope of the claims. It will be understood by those skilled in the art that various changes in form and details may be made therein without departing from the spirit and scope of the invention as defined by the appended claims.

What is claimed is:

1. A vehicle lighting control device comprising:
   a switching unit to perform ON/OFF control of a driving current supplied to a semiconductor light source depending on a light control signal; and
   a constant-current control unit to perform constant-current control on the driving current, the constant current control unit comprising:

a switch unit to perform ON/OFF control of the switching unit; and a signal-maintaining unit to provide a voltage signal corresponding to the driving current to the switch unit when the switching unit performs ON control, and to provide continuously the voltage signal to the switch unit when the switching unit performs OFF control, wherein the signal-maintaining unit comprises a condenser that receives the voltage signal corresponding to the driving current.

2. The vehicle lighting control device according to claim 1 wherein the signal-maintaining unit is arranged to provide the voltage signal to be maintained at the level output during the ON control right before the OFF control.

3. The vehicle lighting control device according to claim 1 wherein the switching unit is series-connected to a positive electrode side of the semiconductor light source.

4. The vehicle lighting control device according to claim 1 wherein the signal-maintaining unit is arranged to provide, to the switch unit, a voltage signal having a voltage greater than that of the voltage signal output during the ON control after a power supply voltage is provided.

5. The vehicle lighting control device according to claim 1 wherein the signal-maintaining unit is arranged to control a current control unit by using at least one time a voltage gain during the ON control.

6. The vehicle lighting control device of claim 1 further comprising an op-amp provided between the signal-maintaining unit and the switch unit.

7. The vehicle lighting control device of claim 6 wherein the switching unit comprises a positive channel metal oxide semiconductor (PMOS) transistor series-connected to the positive electrode side of the semiconductor light source, wherein the switch unit is coupled to a gate of terminal of the PMOS transistor.

8. The vehicle lighting control device of claim 7 wherein the switch unit comprises a transistor that receives a signal from the op-amp, wherein a collector of the transistor is coupled to the gate terminal of the PMOS transistor, and an emitter of the transistor is coupled to ground.

9. The vehicle lighting control device of claim 1, wherein a cathode side of the semiconductor light source is directly connected to ground.

* * * * *